United States Patent [19]

El-Hindi

[11] 3,959,139

[45] May 25, 1976

[54] LIQUID PURIFICATION SYSTEM

[75] Inventor: Ahmad M. El-Hindi, Fabius, N.Y.

[73] Assignee: Filter Tech, Inc., Manlius, N.Y.

[22] Filed: Sept. 16, 1974

[21] Appl. No.: 506,732

[52] U.S. Cl. .................................. 210/97; 210/138; 210/195 S; 210/294; 210/512 R

[51] Int. Cl.² .......................................... B01D 21/24

[58] Field of Search ............. 210/97, 138, 195, 294, 210/320, 322, 512

[56] References Cited

UNITED STATES PATENTS

| | | | |
|---|---|---|---|
| 1,850,483 | 3/1932 | Umont | 210/294 X |
| 2,953,248 | 9/1960 | Trolanos | 210/512 X |
| 3,017,767 | 1/1962 | Mossberg | 210/512 X |
| 3,334,516 | 8/1967 | Cerrone | 210/512 X |
| 3,481,118 | 12/1969 | Willis et al. | 210/512 X |
| 3,540,588 | 11/1970 | Estabrook | 210/512 X |
| 3,563,383 | 2/1971 | Hellquist et al. | 210/320 X |

*Primary Examiner*—John Adee
*Attorney, Agent, or Firm*—Charles S. McGuire

[57] ABSTRACT

An improved hydrocyclone clarifier for removing contaminants from a liquid, wherein the contaminants are of higher density than the liquid. The cylindrical body, downwardly directed conical baffle, clean flow outlet at the top, and contaminated liquid return line at the bottom are provided as in prior devices of this type. In addition, an outflow line for contaminated liquid is provided on the side of the cylindrical body, and includes an adjustable orifice and flow rate or pressure sensor. Clogging is evidenced by a drop in flow or pressure and automatically initiates a cycle. Also, timing means is provided to initiate a purge cycle, if none has been performed in response to clogging within a predetermined time period. The improved hydrocyclone clarifier is also disclosed in a recirculating purification system including settling tanks.

8 Claims, 4 Drawing Figures

LIQUID PURIFICATION SYSTEM

BACKGROUND OF THE INVENTION

The present invention relates to apparatus including hydrocyclone type clarifiers for removing contaminants from a liquid. More particularly, the invention relates to improvements for minimizing the tendency of a hydrocyclone clarifier to become clogged with foreign matter, and to liquid purification systems incorporating such improved clarifiers.

Liquids used as coolants and/or lubricants in many industrial processes are subject to contamination during use which may render the liquid unsuitable for recirculation and repeated use in the process. For example, many metal working processes are cooled and lubricated by flooding the work area with an appropriate liquid. Fine metal particles and other contaminants are carried away with the liquids, which requires removal of the contaminants to a degree sufficient to allow recirculation if the same liquid is to be continuously recycled through the system.

Various purification systems employ holding tanks wherein the contaminated liquid is allowed to stand for a sufficient time for the denser contaminants to settle to the bottom by gravity. Drag conveyors are frequently provided to remove the settled contaminants from the bottom of the tank. In some processes, additional apparatus has been employed to purify the liquid to a greater extent than normally attained only in settling tanks, and to reduce the necessary retention time of the liquid in the tank, thus reducing the required tank capacity. Such manufacturing processes commonly include rolling or drawing of metal wire through dies to reduce or otherwise alter its cross section.

Apparatus generally known as a hydrocyclone clarifier is conventionally used to supplement the liquid purification process. After some degree of contaminant removal by gravity settling, the liquid is pumped through a hydrocyclone which operates generally on the principle of centrifugal force to remove a greater degree of contaminants. A major difficulty, however, with the use of such apparatus is the tendency of relatively constricted nozzles in the contaminated liquid return line to become clogged with foreign matter such as small pieces of cloth, paper and cigarette butts or filter tips.

It is a principal object of the present invention to provide hydrocyclone-type liquid clarification apparatus having a highly reduced tendency to become clogged, as compared to prior art apparatus of the same type.

A further object is to provide a hydrocyclone clarifier which automatically purges itself of impurities.

Still another object is to provide hydrocyclone liquid clarification apparatus automatically responsive either to a predetermined time lapse or to a drop in flow due to clogging to flush out foreign matter or accumulated contaminants.

A still further object is to provide a purification system for industrial process liquids including holding tanks and improved hydrocyclone clarifiers in a liquid recirculation path.

Other objects will in part be obvious and will in part appear hereinafter.

SUMMARY OF THE INVENTION

In accordance with the foregoing objects, the invention provides a hydrocyclone having a cylindrical body with a side outlet connected to the underflow or contaminated liquid return line which communicates with the lower end of the hydrocyclone chamber. Included in the line from the side outlet are a variable orifice valve and a sensing device operable in response to the flow rate or pressure dropping below a predetermined minimum. Throttling of flow through the valve, e.g., by objects upstream tending to clog the orifice, causes the sensing device to initiate a purge cycle whereby a valve in the clean outflow line at the top of the hydrocyclone is closed while valves in both the bottom and side outlet underflow lines are fully opened. The higher pressure thus generated upstream of the two underflow outlet valves causes any foreign objects or materials to be flushed out to a contaminated liquid tank for further processing.

The improved hydrocyclone structure is disclosed in a complete liquid purification system including a three-zone reservoir. Contaminated liquid from the work area is delivered to the first zone, in which some of the solid particles settle to the bottom and are removed by a drag conveyor. From the first zone, the liquid is pumped through the improved hydrocyclone generally described above. The underflow, or contaminated liquid outflow from the hydrocyclone is delivered to a second zone of the reservoir, or other compartment or separate tank isolated from the aforementioned first zone. In the second zone, additional particles settle by gravity and are removed by a drag conveyor, or the like, with liquid at the upper surface flowing over a wier into a third zone. The latter includes an intermediate baffle on one side of which the third zone communicates by underflow with the first zone and on the other side of which clarified liquid is removed and returned to the work area. The clean outlet from the top of the hydrocyclone is also delivered to the third zone on the side of the baffle from which liquid is removed for supply back to the work area, thus completing the continuous flow path.

Additional details of the invention will, of course, be disclosed in the following detailed description, the preceding summary being intended merely as a general outline.

DETAILED DESCRIPTION

Figure 1:
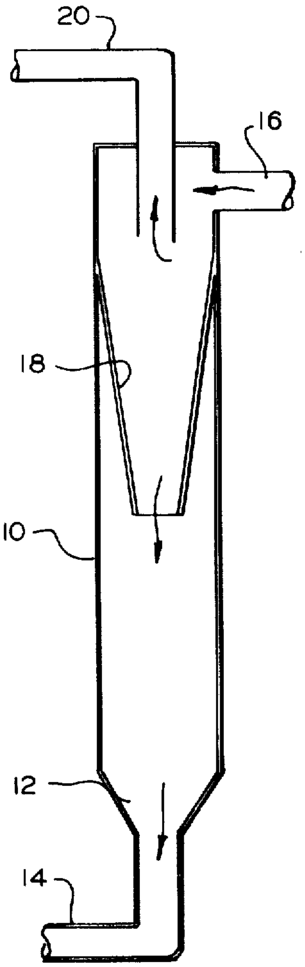
FIG. 1 is a somewhat diagrammatic, elevational view, in half section, of a typical prior art hydrocyclone clarifier.

In FIG. 1 is shown in very general form liquid clarification apparatus of the type generally known as "hydrocyclones", from the manner of operation thereof. The apparatus includes cylindrical body 10, tapering at the lower end toward a relatively constricted nozzle 12 communicating with underflow line 14. Contaminated liquid enters through inlet line 16 generally tangentially to the interior of body 10, thereby imparting rotation to the liquid. Inlet pressure is maintained at a high enough level to insure high velocity rotation of the liquid.

Downwardly directed conical baffle 18 is sealed to the interior wall of body 10 below the opening for inlet line 16, and is open at its lower end. The rotational velocity of the liquid will thus be increased as it moves toward the smaller diameter end of baffle 18, thereby increasing the tendency of higher density impurities to be carried to the baffle wall surface. Outlet line 20 communicates with the interior of body 10 at the upper end thereof. Since nozzle 12 is smaller than inlet line 16, body 10 will fill with liquid, that rising at the center being relatively free of impurities. The clarified liquid is removed through outlet 20 while the impurities of higher density than the liquid are carried by centrifugal force to the interior wall of body 10 and settle by gravity toward the lower end of body 10 and are removed with a portion of the liquid through nozzle 12 and line 14. However, flow through nozzle 12 may be substantially decreased or stopped by foreign matter becoming lodged therein thus destroying the clarifying efficiency of the hydrocyclone.

Figure 2:
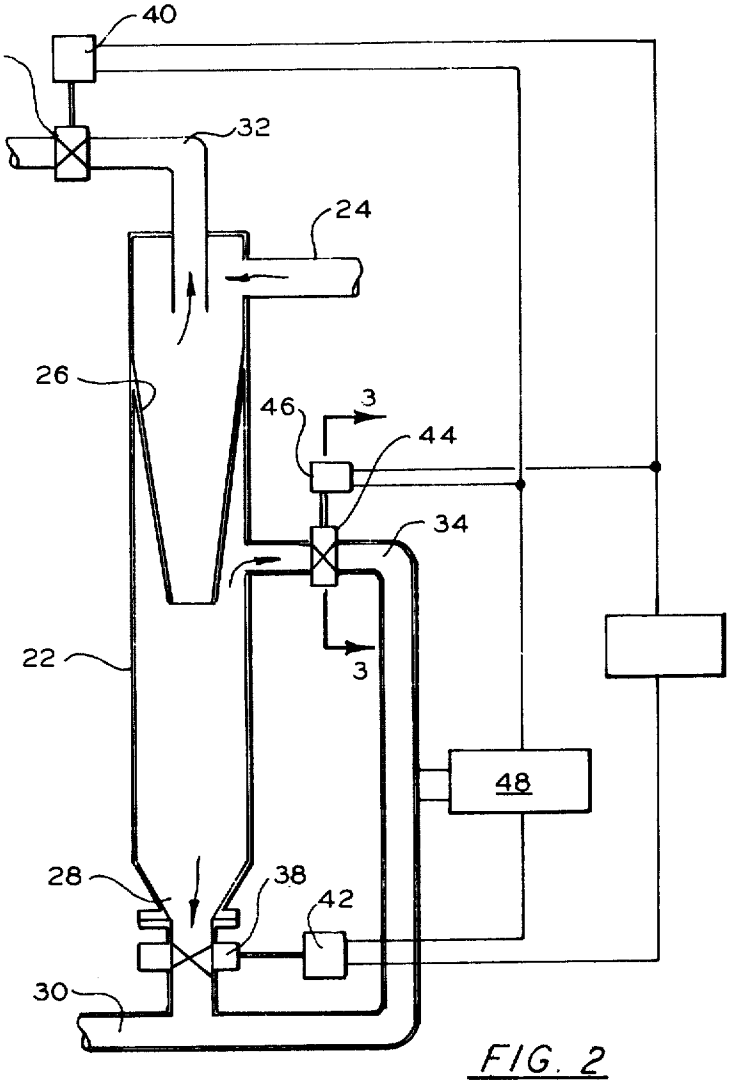
FIG. 2 is a similar view of the preferred embodiment of the improved hydrocyclone clarifier of the present invention.

Turning now to FIG. 2, the improved construction of the present invention is shown in a device generally similar to that of FIG. 1. Again, the hydrocyclone includes cylindrical body 22, inlet line 24, internal conical baffle 26, lower outlet nozzle 28 communicating with underflow line 30 and upper outlet line 32. In addition, side outlet line 34 is provided, communicating with the interior of body 22 through an opening generally adjacent the lower end of baffle 26, although such positioning is not critical. Side outlet line 34 communicates directly with underflow line 30, the return line for liquid containing impurities.

Valve 36 is provided in upper outlet line 32 for the clarified liquid, and valve 38 is provided adjacent outlet nozzle 28. Both valves 36 and 38 are movable between fully open and fully closed positions in conventional fashion by actuation of suitable control means, indicated generally at 40 and 42, respectively, such as solenoids, for example. Valve 44, having control means 46, is provided in outlet line 34 adjacent the side opening in body 22, and sensor 48 is provided downstream from valve 44 in line 34. Sensor 48 is a conventional device, responsive to a decrease in the flow rate through line 34 to actuate valve control means 40, 42 and 46 as explained more fully hereinafter. Sensor 48 may be a flow rate sensing device or a pressure switch, since a decrease in flow rate caused by throttling of the flow through valve 44 will also be evidenced by a drop in pressure.

Figure 3:
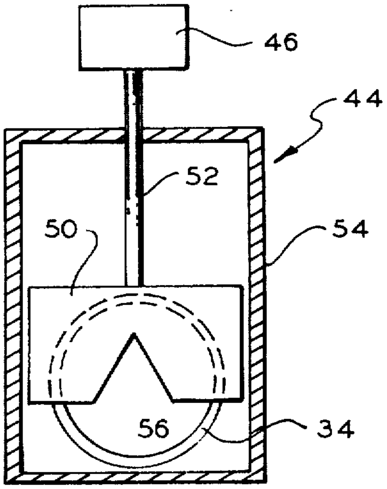
FIG. 3 is an enlarged sectional view of a portion of the apparatus of FIG. 2, taken on the line 3—3 thereof.

Valve 44 is shown in more detail in FIG. 3, including plate 50, attached to control rod 52, and housing structure 54, enclosing a portion of line 34 passing therethrough. Plate 50 is positioned within outlet line 34 and includes notched lower edge 56 which defines, with the lower interior surface of line 34, an orifice having a size variable in accordance with the position of plate 50. Control means 46 is actuable electrically, pneumatically, or by other conventional means, to move rod 52, and thereby plate 50, transversely across line 34, in the directions indicated by arrows 58, and to maintain the plate in a position such that the orifice defined thereby is sufficient to establish a desired rate of flow through line 34. Housing 54 is large enough to accommodate the required range of movement of plate 50. Appropriate sealing means are provided where rod 52 passes through housing 54.

During normal operation, valve 36 is fully open and valve 38 is fully closed. Valve 44 is positioned to establish a desired flow rate through line 34. Thus, clarified liquid is removed from the device through line 32, contaminated liquid is removed through lines 34 and 30, and sludge may accummulate in the lower end of body 10. When flow through valve 44 is throttled due to blockage by foreign matter, the resulting decrease in flow rate or pressure will be sensed by sensor 48, triggering a signal to valve controls 40, 42 and 46. Valve 36 is moved from fully open to fully closed position, and valves 38 and 44 are both moved to the fully open position in response to the signal. The higher upstream pressure generated by closure of valve 36 will cause all foreign matter and sludge to be flushed out of body 10 through both of valves 38 and 44. After a predetermind time period, which may normally be on the order of a few seconds, valves 36 and 38 are moved back to the fully open and fully closed positions, respectively, and valve 44 is returned to the position of plate 50 establishing the desired flow rate. Normal operation will thus be resumed, both the foreign matter which initially clogged or throttled flow through valve 44 and any sludge which had accummulated in the area of nozzle 28 having been removed during the purge cycle.

Figure 4:
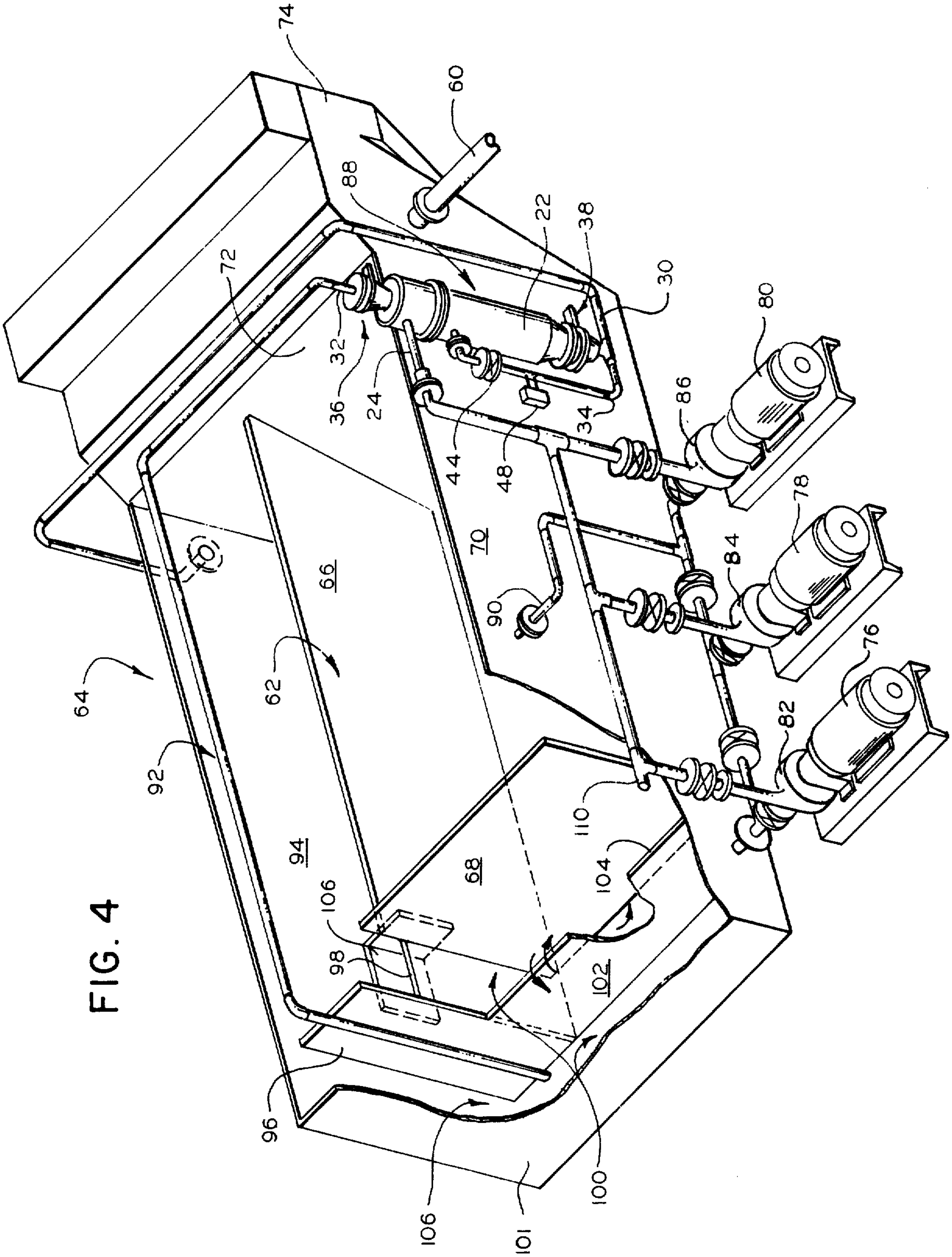
FIG. 4 is a perspective view, with portions broken away, of a complete liquid purification system embodying the present invention.

In FIG. 4 is shown a liquid clarification system wherein liquid from an industrial process work area is delivered through line 60 to main compartment 62 of a reservoir system generally denoted by reference numeral 64. Compartment 62 is defined by walls 66, 68, 70, and inclined forward wall 72. A drag conveyor (not shown) is provided in the usual manner in compartment 62 to move continuously across the bottom of the compartment and carry solid impurities which settle by gravity up the incline at the forward end and deposit them in sludge discharge chute 74.

Three motors 76, 78 and 80 drive associated pumps 82, 84 and 86, respectively. Pump 84 is a common standby pump for the other two, the functions of which will be explained later, with appropriate lines and valves provided as indicated in the drawing to allow such use. Hydrocyclone clarifier 88 is of the construction described in connection with FIGS. 2 and 3, whereby common reference numerals are used to denote the elements thereof shown in FIG. 4.

Liquid is taken from compartment 62 via line 90, at the opposite end of the compartment from inlet 60. The capacity of compartment 62 is related to the flow rate of liquid therethrough to achieve a desired degree of clarification by settling out of solids. Pump 86 (or pump 84) moves the partially clarified liquid from line 90 to inlet line 24 of hydrocyclone 88 wherein it is treated in the manner described earlier herein. Underflow line 30 carries the portion of the liquid containing the impurities to a second compartment 92 of reservoir 64. Compartment 92 is defined by wall 66, common to both compartments 62 and 92, a portion of inclined front wall 72, and walls 94 and 96. Preferably, compartment 92 is conveyorized in the same manner as compartment 62 for removal of solids which settle to the bottom while the liquid is retained in compartment 92.

A weir is formed by upper edge 98 of wall 66 on the opposite side of wall 68 from the portion thereof common to compartments 62 and 92. Edge 98 is lower than the upper edge of the common portion of wall 66. Thus, liquid at the upper surface within compartment 94 will flow over edge 98 into a third compartment 100, defined by the portion of wall 66 common with compartment 92, wall 68, common with compartment 62, a portion of wall 70, and end wall 108. Within compartment 100 is baffle 102, adjacent to and coplanar with wall 96, but having an upper edge 104 considerably lower. Baffle 106 prevents floating solids from flowing over edge 98 from compartment 92 to compartment 100. Further settling may take place in compartment 100, although it is of considerably smaller volume and hence has a much smaller retention time.

Compartment 100 is provided for the liquid which has been purified to the extent necessary for return to and reuse in the work area. The clarified liquid leaving hydrocyclone 88 via line 32 is discharged into compartment 100, and overflow from compartment 92 passing over edge 98 is likewise received in compartment 100. Pump 82 (or pump 84) removes the purified liquid from compartment 100 and returns it to the work area via line 110.

The above-described system is intended to provide clarification without filtration, i.e., by a combination of settling and hydrocyclone clarification, both for economy and since some desirable ingredients of the solution may be removed by a surface type filter. However, the process may be modified, if desired, by pumping the liquid through a suitable filter between compartments 92 and 100, rather than transfer only by overflow, as described. Since compartment 62 receives the total liquid volume from the work area and compartment 92 receives only the portion returned through underflow line 30, the retention time is considerably longer, with a relatively small flow rate, in compartment 92.

As indicated in the drawing wall 68 does not extend to the bottom of reservoir 64, but instead provides underflow communication between compartments 62 and 100. This provides the important feature of allowing variations in flow rates to and from the various compartments while maintaining substantially constant rates of circulation of the liquid to and from the work area. For example, partially clarified liquid may be removed from compartment 62 through line 90 at a greater rate than it is supplied through line 60. All of the liquid removed from compartment 62 is delivered to compartment 100, either directly from hydrocyclone 88 or from compartment 92. Since liquid is returned to the work area through line 110 at substantially the same rate at which it is supplied to reservoir 64 through line 60, the liquid is being supplied to compartment 100 at a greater rate than it is being pumped therefrom. The excess liquid may flow from compartment 100 under wall 68 to compartment 62 for recirculation.

On the other hand, during a purge cycle of hydrocyclone 88 no liquid will be provided to compartment 100 through line 32 since valve 36 is closed. Thus, liquid will be removed from compartment 100 at a greater rate than it is supplied. As this tends to lower the liquid level in compartment 100, liquid will flow under wall 68 from compartment 62 to compartment 100, since the direct, underflow communication keeps the liquid levels in these two compartments equal. The function of baffle 102 is concerned with flow from compartment 62 to compartment 100. Since clean liquid is removed from compartment 100 on the opposite side of baffle 102 from entry of contaminated liquid under wall 68, it is unlikely that dirty liquid will be pumped out through line 110. That is, while dirty liquid will flow from compartment 62 to compartment 100 during a purge cycle, the direction of flow will be reversed at the end of the cycle. During the relatively short time of the cycle, the flow rate out of compartment 100 is not sufficient to allow dirty liquid entering from compartment 62 to rise and flow over edge 104 of baffle 102 as it must do before reaching the outlet line to pump 82.

It is also important to note that if, for any reason, the hydrocyclone line is shut down entirely, liquid may flow from compartment 62 to compartment 100 to allow recirculation to continue. Although there is no clarification by the hydrocyclone, and thus no supply to compartment 100 either directly from hydrocyclone 88 or from compartment 92, it is still desirable to continue recirculation to avoid the necessity of shutting down the industrial process wherein the liquid is utilized. Although not clarified to the extent it would otherwise be, some impurities are removed from the liquid by settling since flow under wall 68 is at the opposite end of compartment 62 from entry through line 60.

The described system will operate automatically for long time periods without failure due to the unique self-purging action of hydrocyclone 88. Whenever a blockage occurs, or flow through line 34 is restricted for any other reason, sensor 48 initiates a signal which actuates the control means of valves 36, 38 and 44. Valve 36 fully closes, thereby cutting off flow to compartment 100. Both valves 38 and 44 move to the fully open position as the higher pressure caused by closure of valve 36 flushes all sediment and foreign matter out of body 22, and line 34, carrying it through line 30 to compartment 92. After a predetermined interval, which may be only a few seconds for most applications, timer 112 initiates a signal causing actuation of the respective valve control means to move valves 36 and 38 back to the fully open and fully closed positions, respectively, and to move valve 44 back to the position establishing the desired orifice size. Also, since it is desirable to remove sludge deposits from the area of nozzle 28 periodically in any case, timer 112 may be constructed and set according to known techniques to cause a triggering signal to be generated after a predetermined time lapse from the last signal triggered by throttling of valve 44. That is, a purge cycle may be initiated by timer 112 even without a drop in flow rate or pressure in line 34. Valve operation in initiating and terminating the purge cycle is the same whether triggered by throttling or clogging of valve 44 or by time lapse.

What is claimed is:

1. Apparatus for removing impurities from liquids wherein the density of the impurities is greater than that of the liquid, said apparatus comprising:

a. a hollow cylindrical body having upper and lower ends;

b. inlet means adjacent said upper end for entry of a liquid in a direction inducing rotary motion of the liquid within said body;

c. first outlet means adjacent said lower end of said body;

d. second outlet means in one side of said body intermediate of said upper and lower ends;

e. third outlet means adjacent said upper end of said body;

f. first, second and third valve means associated with each of said first, second and third outlet means, respectively;

g. said second valve means defining an orifice and being movable to vary the size of said orifice;

h. sensing means adapted to generate a signal in response to a predetermined restriction in the flow of liquid through said orifice; and i. control means actuable in response to said signal to move said first and second valve means fully open and said third valve means fully closed.

2. The invention according to claim 1 and further including means to actuate said control means a predetermined time after actuation thereof by signal to move said first valve means fully closed, said second valve means to a position defining an orifice of predetermined size, and said third valve means fully open.

3. The invention according to claim 2 wherein said means is arranged to actuate said control means to move said first and second valve means fully open and said third valve means fully closed after a second predetermined time beginning with the previous actuation by said timing means in the absence of actuation of said control means by said signal during said second predetermined time.

4. The invention according to claim 1 and further including a truncated conical baffle, open at both ends within said body, having a base diameter equal to that of said body and sloping inwardly toward said lower end.

5. The invention according to claim 1 wherein said first and second outlet means are connected to a common return line.

6. The invention according to claim 1 and further including a first settling compartment having front and rear ends with inlet and outlet lines respectively adjacent thereto, means connecting said cylindrical body inlet to said first compartment outlet, a second settling compartment having front and rear ends with an inlet line adjacent to the former connected to said first outlet means of said cylindrical body, a third compartment arranged to receive liquid overflowing from said second compartment rear end and from said third outlet means of said cylindrical body, a common wall separating said first and third compartments at the rear end of said first compartment, said common wall allowing underflow communication between said first and third compartments, and an outlet line for removing liquid from said third compartment.

7. The invention according to claim 6 and further including a baffle extending upwardly from the bottom of said third compartment between said common wall and said outlet line thereof.

8. The invention according to claim 7 wherein said overflow from said second compartment enters said third compartment on the side of said baffle on which said common wall is located, and clean liquid is received in said third compartment on the side of said baffle on which said outlet line thereof is located.

* * * * *